US011697555B2

(12) United States Patent
Grävingholt et al.

(10) Patent No.: US 11,697,555 B2
(45) Date of Patent: Jul. 11, 2023

(54) CONVEYING DEVICE

(71) Applicant: KHS GmbH, Dortmund (DE)

(72) Inventors: Stefan Grävingholt, Witten (DE);
Thomas Greiving, Lüdinghausen (DE);
Berthold Paroth, Dortmund (DE);
Zlatko Sarajlija, Dortmund (DE)

(73) Assignee: KHS GmbH, Dortmund (DE)

( * ) Notice: Subject to any disclaimer, the term of this patent is extended or adjusted under 35 U.S.C. 154(b) by 589 days.

(21) Appl. No.: 16/763,686

(22) PCT Filed: Nov. 26, 2018

(86) PCT No.: PCT/EP2018/082521
§ 371 (c)(1),
(2) Date: May 13, 2020

(87) PCT Pub. No.: WO2019/110347
PCT Pub. Date: Jun. 13, 2019

(65) Prior Publication Data
US 2021/0403241 A1     Dec. 30, 2021

(30) Foreign Application Priority Data
Dec. 8, 2017   (DE) .................... 10 2017 129 298.5

(51) Int. Cl.
| | |
|---|---|
| *B65G 15/62* | (2006.01) |
| *B65G 21/06* | (2006.01) |
| *F16B 21/07* | (2006.01) |
| *F16B 21/08* | (2006.01) |
| *B65G 21/22* | (2006.01) |
| *B65G 15/64* | (2006.01) |

(52) U.S. Cl.
CPC ............. *B65G 15/62* (2013.01); *B65G 15/64* (2013.01); *B65G 21/06* (2013.01); *B65G 21/22* (2013.01); *F16B 21/075* (2013.01); *F16B 21/086* (2013.01)

(58) Field of Classification Search
CPC ........ B65G 15/62; B65G 21/06; B65G 21/22; B65G 15/64; F16B 21/075; F16B 21/086; F16B 5/12; F16B 21/07; F16B 21/08; F16B 21/16; F16B 2/12
USPC ..................................................... 198/750.2
See application file for complete search history.

(56) References Cited

U.S. PATENT DOCUMENTS

| | | | |
|---|---|---|---|
| 3,074,134 A | 1/1963 | Buechler | |
| 3,825,108 A * | 7/1974 | Stone ..................... | B65G 21/06 198/570 |
| 5,782,340 A * | 7/1998 | Dolan ................... | B65G 17/086 198/840 |
| 6,170,649 B1 | 1/2001 | Radandt et al. | |
| 6,269,939 B1 | 8/2001 | Lapeyre et al. | |

(Continued)

FOREIGN PATENT DOCUMENTS

| | | |
|---|---|---|
| DE | 1220673 B | 7/1966 |
| DE | 2136108 A1 | 2/1973 |

(Continued)

*Primary Examiner* — James R Bidwell
(74) *Attorney, Agent, or Firm* — Occhiuti & Rohlicek LLP

(57) ABSTRACT

A conveying device includes a quick fastener that connects a profiled element to a machine frame's base support and that supports a sliding strip on which a conveying element slides as it circulates around deflection elements to form a loop and conveys goods along a transport direction.

31 Claims, 20 Drawing Sheets

(56) References Cited

U.S. PATENT DOCUMENTS

| | | | | |
|---|---|---|---|---|
| 6,427,830 B1* | 8/2002 | Ciccorilli | ............... | B65G 15/62 |
| | | | | 198/841 |
| 6,533,108 B1* | 3/2003 | Ledingham | ............ | B65G 21/02 |
| | | | | 198/841 |
| 6,848,572 B1* | 2/2005 | Sisson, Jr. | ............... | B65G 21/06 |
| | | | | 198/860.1 |
| 7,562,766 B2* | 7/2009 | Call | ....................... | B65G 23/10 |
| | | | | 198/840 |
| 8,051,976 B2* | 11/2011 | Koeda | .................... | B65G 21/06 |
| | | | | 198/837 |
| 9,522,785 B1 | 12/2016 | Rottier et al. | | |
| 2002/0037389 A1 | 3/2002 | Miyano et al. | | |

FOREIGN PATENT DOCUMENTS

| | | |
|---|---|---|
| DE | 102017129298 A1 | 6/2019 |
| EP | 0895948 A1 | 2/1999 |
| FR | 2138804 A1 | 1/1973 |
| GB | 1171168 A | 11/1969 |
| WO | 2017087321 A1 | 5/2017 |

\* cited by examiner

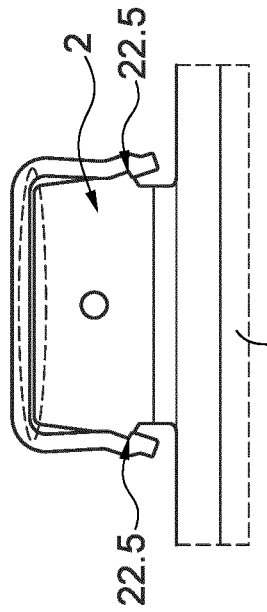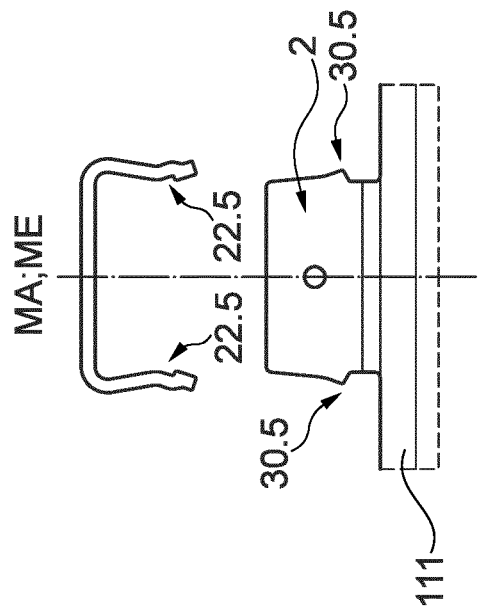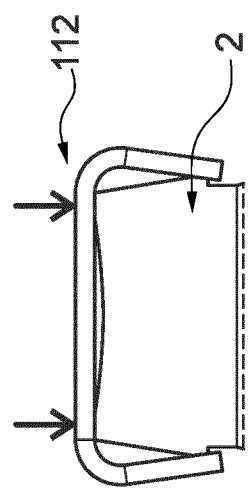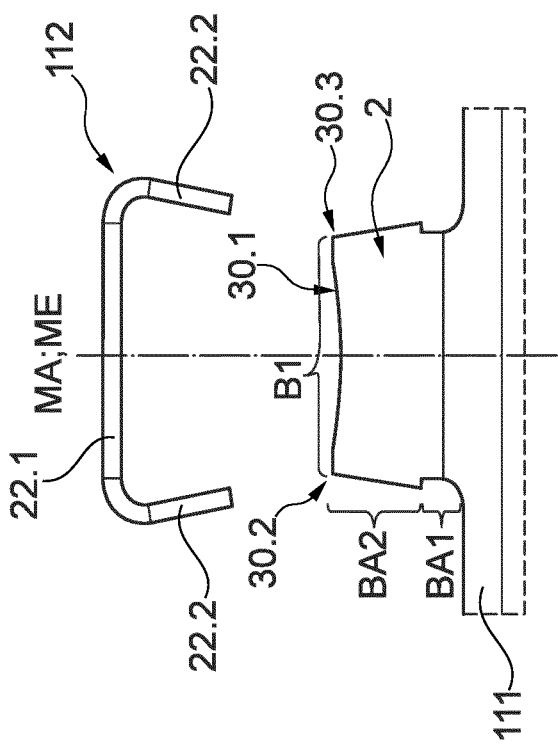
Fig. 4c
Fig. 4d
Fig. 4a
Fig. 4b

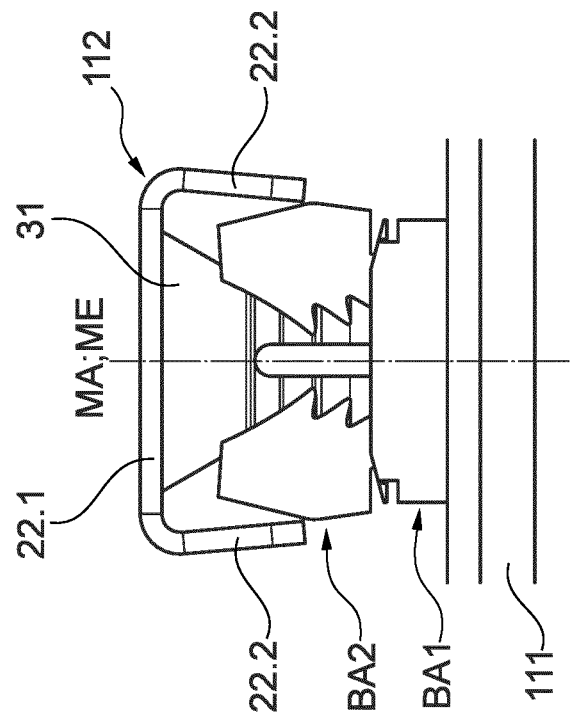
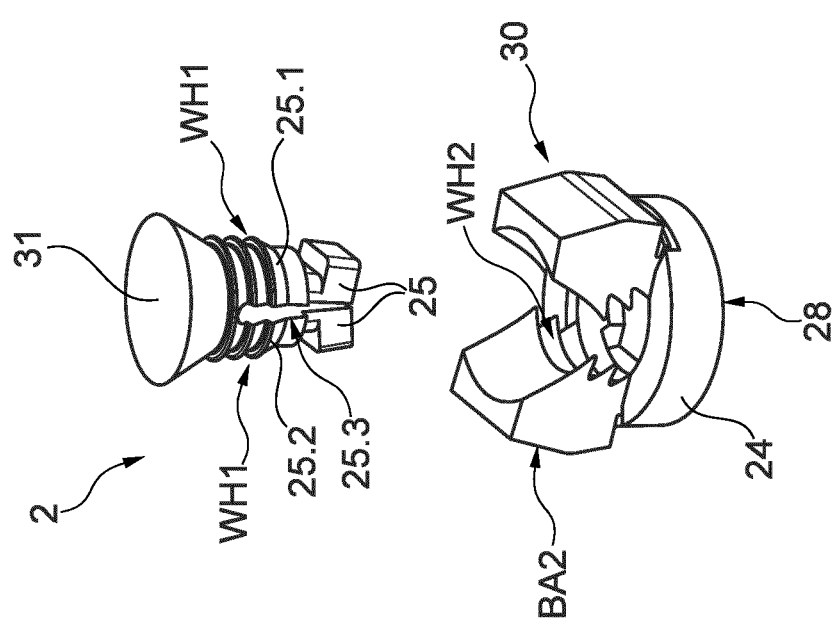

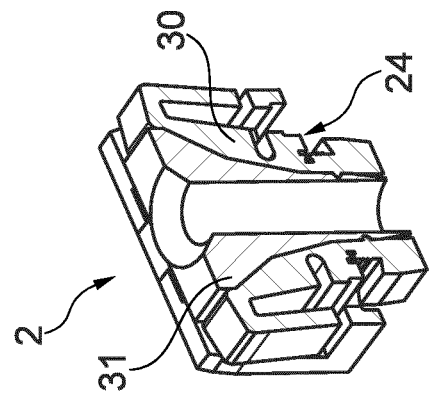
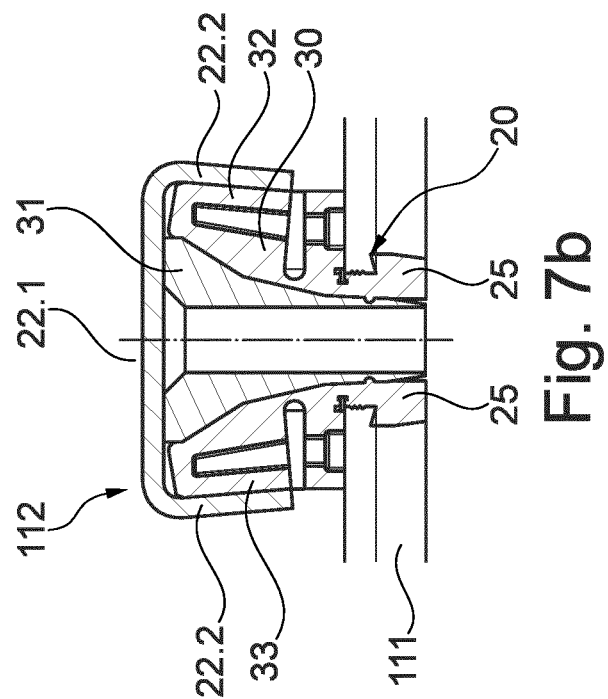
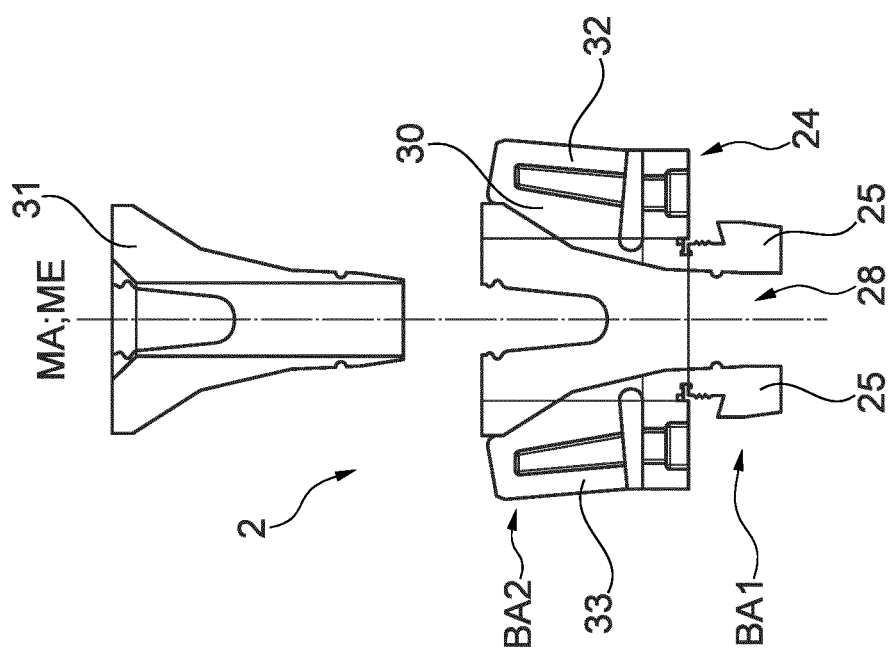

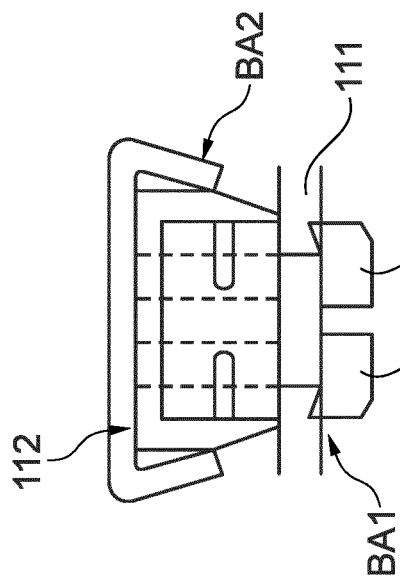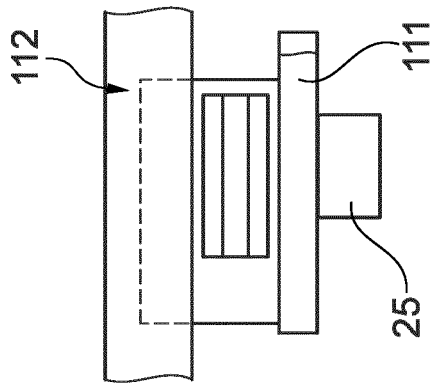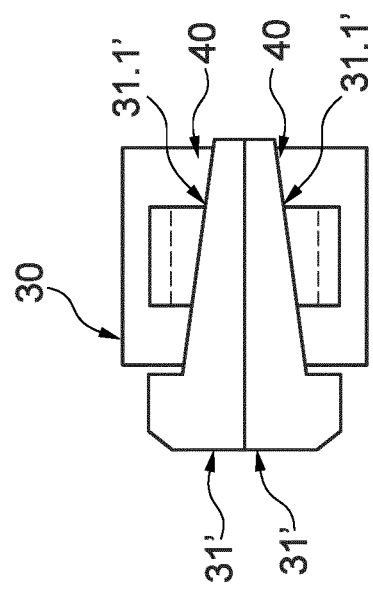

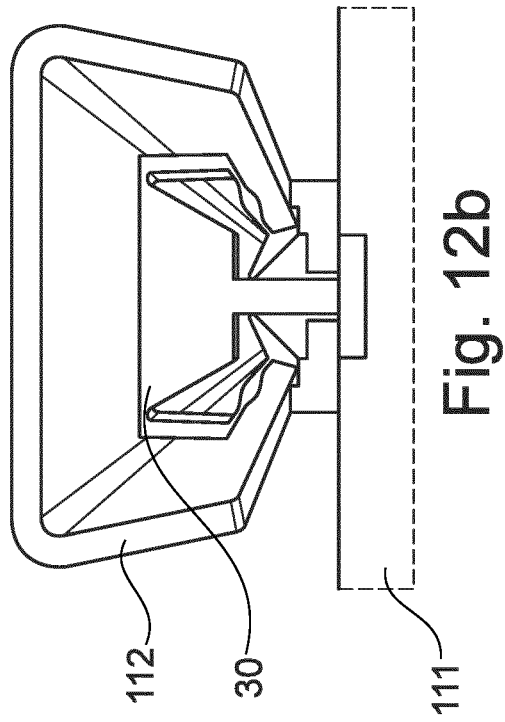
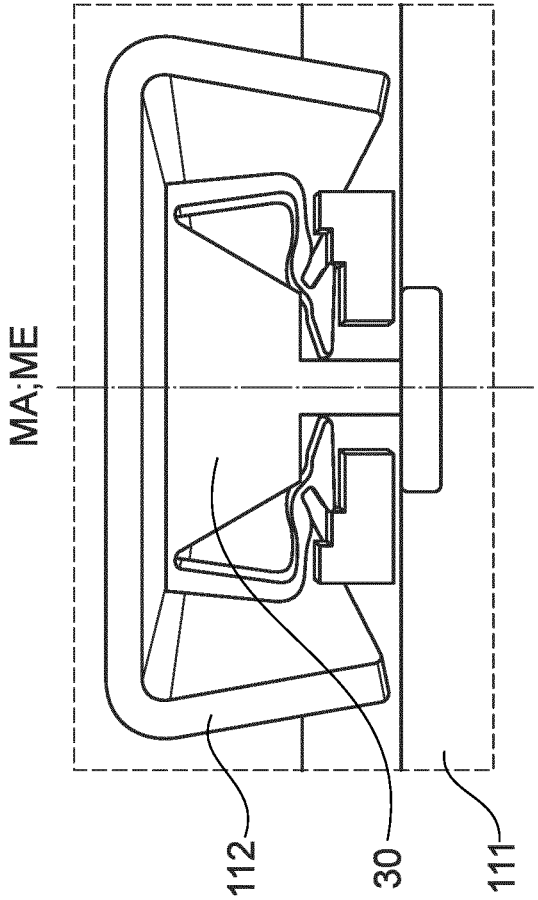
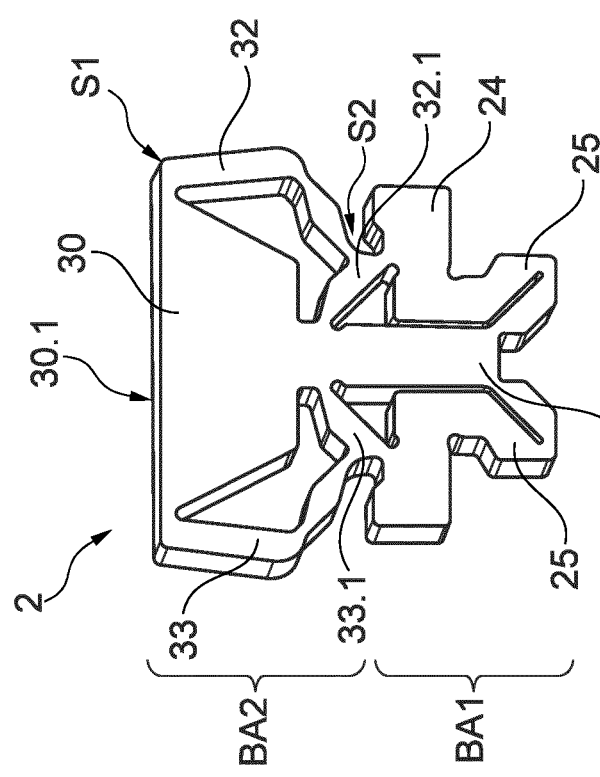

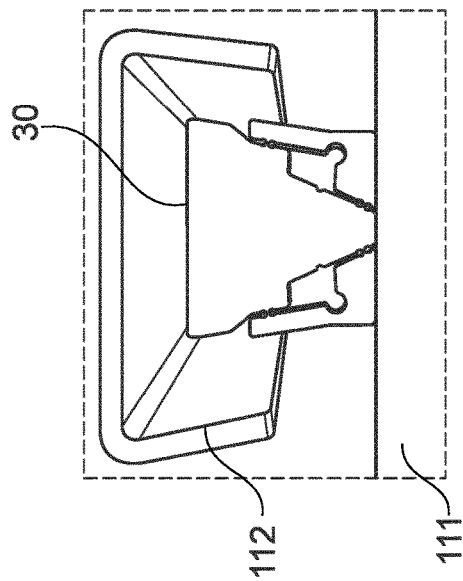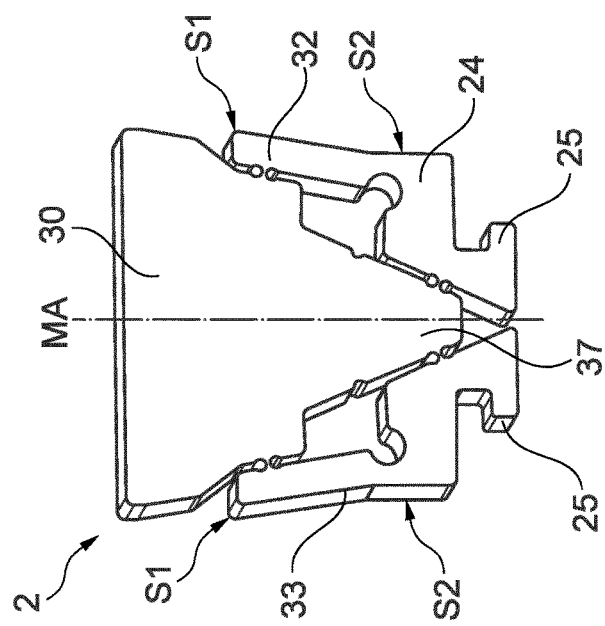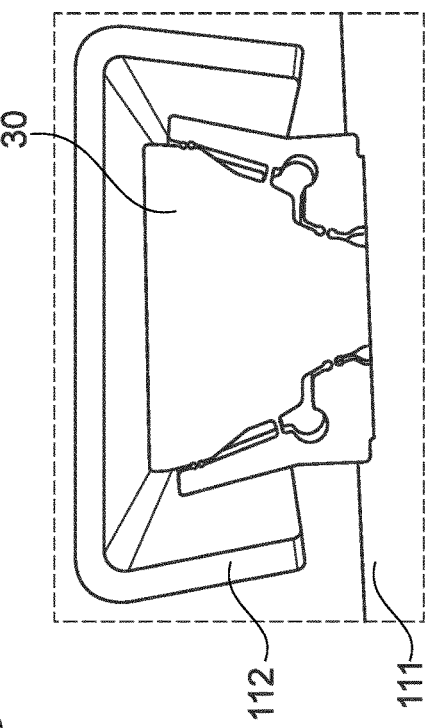

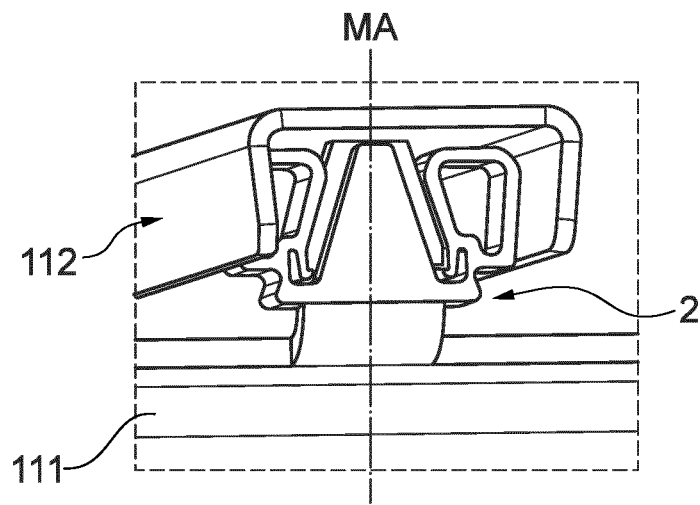
Fig. 15a
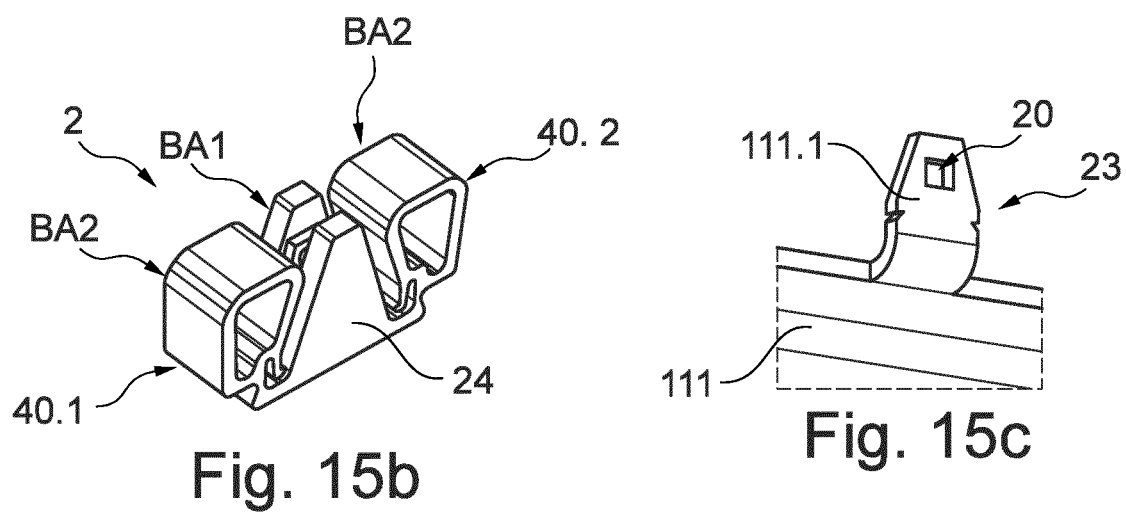
Fig. 15b
Fig. 15c

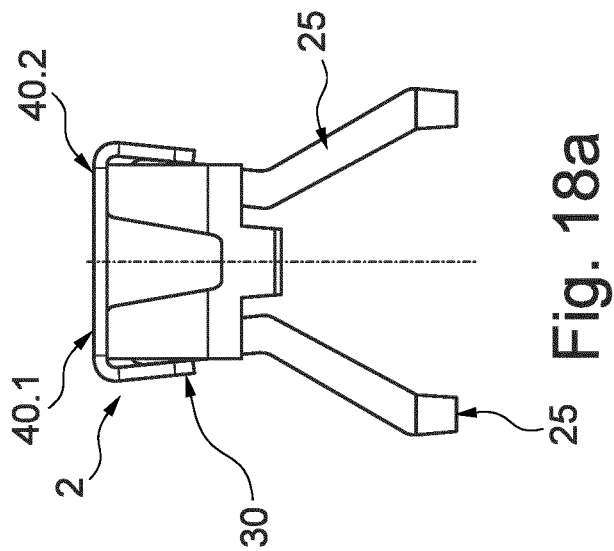
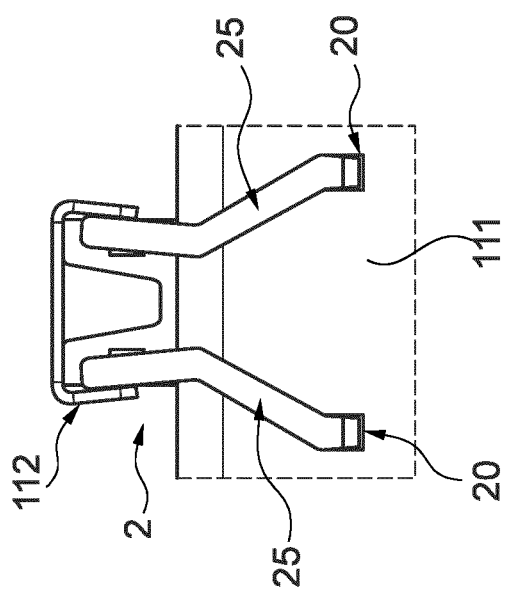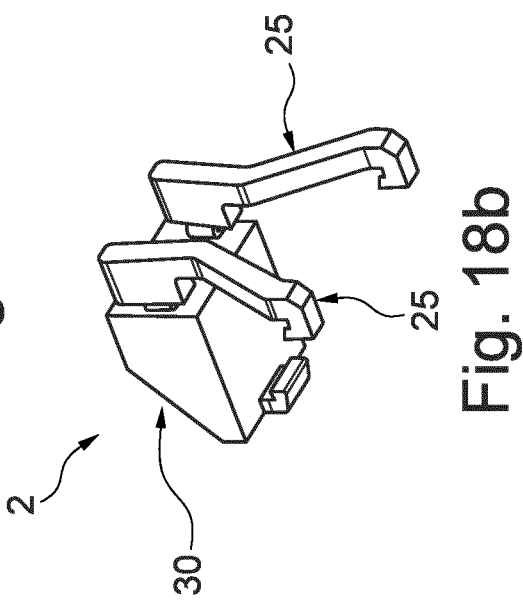

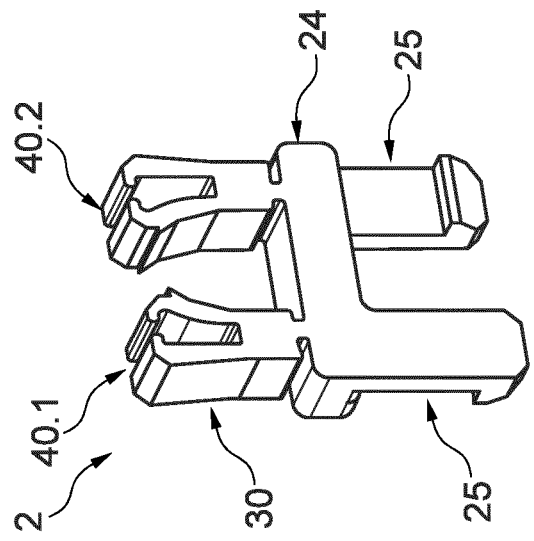
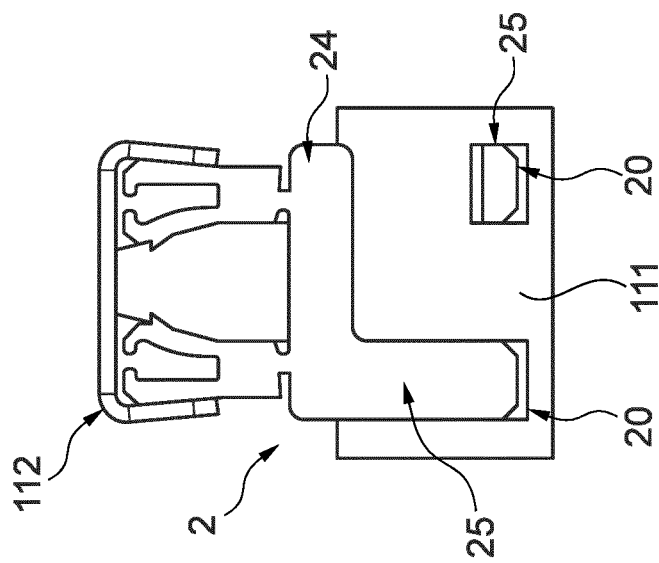

CONVEYING DEVICE

RELATED APPLICATIONS

This is the national stage of international application PCT/EP2018/082521, filed on Nov. 26, 2019, which claims the benefit of the Dec. 8, 2017 priority date of German application DE 102017129298.5, the contents of which are herein incorporated by reference.

FIELD OF INVENTION

The invention relates to a conveying device for conveying goods in a direction of conveyance.

BACKGROUND

Conveying devices used in the beverage industry typically include conveying elements that form a loop. The conveying elements form a horizontal conveying plane. An upper length of the plane is supported against a sliding guides. The conveying elements are typically chains, such has hinged band chains. Such conveying devices operate at high volumes. Typically, they can convey more than 10,000, and in some cases, more than 50,000 units per hour.

SUMMARY

An object of the invention is that of providing a conveying device that conveys goods along a direction and that promotes a reliable and stable connection between components of the conveying device.

In one aspect, the invention features a fastening device for connecting a profiled element to a base support. The fastening device is a quick-fastening device, or "quick fastener." A quick-fastening device is one that makes a connection without the need for a screw, bolt, or equivalent coupling. Such a device makes it possible to connect the base support without a screw while also providing a stable and positionally-fixed connection of the two components.

In some embodiments, the quick fastener is adjustable into a locking position in such a way that it connects the profiled element securely to the base support.

In other embodiments, the quick fastener comprises first and second securing sections with which a profiled element and/or the base support are connected.

Embodiments include those in which the first and/or second securing section provides a non-positive fit in the quick fastener's locking position and those in which one or both of the securing sections provides a positive fit connection in the quick fastener's locking position.

In some embodiments, a first and/or second securing section, in the locking position, is inserted and/or pressed and/or pressured into the profiled element and/or into the base support, and specifically into a perforation of the base support and/or into a cut-out opening of the profiled element and, preferably, latched there in the locking position.

In other embodiments, a first and/or second securing section, in the locking position is snapped into the profiled element and/or into the base support.

In still other embodiments, the first and/or second securing section, in the locking position, is/are securely connected to the profiled element and/or the base support, and the first and/or second securing section engages with at least one locking element behind the perforation of the base support and/or a cut-out opening of the profiled element.

In still other embodiments, a profiled element, in the locking position, is configured such as to be pressed and/or pressured onto the quick fastener, preferably in such a way that the quick fastener, in the locking position, connects the profiled element securely to the base support.

Some embodiments feature a plastically-deformable quick fastener. This deformability enables it to enter into a locking position.

In some embodiments, the quick fastener enters into a locking position by being pressed and/or pressured against the profiled element and/or the base support.

Embodiments include those in which the quick fastener is a unitary structure formed as a single piece and those in which it is a multi-part structure formed of multiple pieces.

Other embodiments include those in which the quick fastener is made of a metallic material, those in which it is made of steel, those in which it is made of plastic, those in which it is made of a special steel, those in which it is made of POM, and those in which it is made of or a plastic, and those in which it is made of polyoxymethylene. Still other embodiments include those in which the quick fastener is configured to be securely connected to the base support. Among these are embodiments in which the quick-fastening unit, in particular, a securing section thereof, is welded, adhesively bonded, or soldered to the base support.

In some embodiments, the quick fastener and the base support are integral with each other. In other embodiments, they form a single unitary structure. And in other embodiments, they form one piece. In still other embodiments, the profiled element has two side limbs that form a groove at their free ends. This groove serves as a snap-in section into which nose-shaped engagement sections provided at the clamping body can latch into engagement. The engagement is one that results in a positive fit or in a full-contact fit. In other embodiments, the quick fastener is a multi-part structure. Among these are two-part quick fasteners that have a clamping body and a drive body. The clamping body forms a second securing section to which the profiled element can be secured. The drive body forms a first securing section by means of which the quick fastener can be arranged on the base support.

In some embodiments, a clamping body comprises an opening that is concentric with a middle longitudinal axis and that at least partially penetrates through the body. This opening is one into which the drive body can be pushed.

In some embodiments, the drive body, in the locking position, is inserted into the opening of the clamping body and pressed by the profiled element in the direction of the base support. This causes first counter-hooks of the drive body to engage second counter-hooks of the clamping body. As a result, in the locking position, the drive body is received in the clamping body. In some of these embodiments, this results in a non-positive fit. In others, it results in a positive fit. In some embodiments, the first and the second securing sections are formed at the clamping body.

In some embodiments, the clamping body comprises, in its second securing section, tabs. The tabs are elastically deformable in the direction of the middle longitudinal axis. In the locking position, the tabs impose tension on the inner sides of the side limbs.

In some embodiments, the quick fastener is a three-part device that comprises two drive bodies and one clamping body, in order, in the second securing section, to attach the profiled element securely to the quick fastener. In some embodiments, two identical drive bodies comprise, in each case, a wedge-shaped contact surface. For the locking position, this can be moved into corresponding wedge-shape contact surfaces that are provided in the clamping body, either by pressing or pushing. In some embodiments, the quick fastener comprises at least two locking elements. Among these are embodiments in which the locking elements are locking fingers configured as counter-hooks. During tensioning, the drive body spreads these so that, in the locking position, they can be hooked into the perforation of the base support on its underside.

In some embodiments, the quick fastener has at least two identically shaped clamping bodies, preferably approximately S-shaped, as well as a drive body. At the clamping body, on the side opposite the second securing section, a first securing section, with a locking element, is formed along the middle longitudinal axis.

In some embodiments, the quick fastener includes a plate and a clamping body, which in turn is formed as an upside-down trapezoid. The trapezoid has lateral arm-shaped tab sections with opposed first and second ends. A transverse arm connects the second end to a contact section. In some embodiments, a punch section penetrates the contact surface t along the middle longitudinal axis thereof. The punch section is movable along the middle longitudinal axis in the direction of the locking elements.

In other embodiments, the tab sections are connected directly at their second end to the contact section.

In yet other embodiments, the tab section's second end is in the region of a free face side of the contact section.

In other embodiments, the base support comprises a tab section that curves upwards toward the profiled element. The tab section has a flat surface section with a non-circular perforation or opening. The quick fastener is pushed or pressed and/or pressured through the opening with its first securing section on the tab section secured with clamping effect in the locking position.

In other embodiments, the clamping body is formed by spring-loaded arms on opposite sides of the middle longitudinal axis. An elastic spring force connects the arms connect to the contact section. In the locking position, the arms spread on the inner side of the side limb against the spring force.

In still other embodiments, locking elements on opposing sides of the flat surface section engage corresponding perforations in the base support and are held in these in the locking position. The quick fastener can then be pressed and/or pressured onto the base support.

The expression "essentially" or "approximately" signifies in the meaning of the invention deviations from the respective exact value by +/−10%, preferably by +/−5%, and/or deviations in the form of changes which are not of significance for the function.

Further embodiments, advantages, and possible applications of the invention also derive from the following description of exemplary embodiments and from the Figures. In this situation, all the features described and/or figuratively represented are in principle the object of the invention, individually or in any desired combination, regardless of their inclusion in the claims or reference to them. The contents of the claims are also deemed a constituent part of the description.

BRIEF DESCRIPTION OF THE DRAWINGS

The invention is explained hereinafter on the basis of the Figures in relation to exemplary embodiments. The Figures show:

FIGS. 4a-d are side views of different embodiments of a quick fastener;

FIGS. 5a-5c show further embodiments of a quick fastener;

FIG. 6b is a plan view of the opening in FIG. 6a;

FIGS. 7a-7c show a further embodiment of a quick fastener;

FIGS. 10a to 10c show a further embodiment of a quick fastener;

FIGS. 12a to 12c show a further embodiment of a quick fastener;

FIGS. 14a to 14c show a further embodiment of a quick fastener;

FIGS. 15a to 15c show a further embodiment of a quick fastener;

FIGS. 18a to 18c show a further embodiment of a quick fastener;

FIGS. 19a and 19b show a further embodiment of a quick fastener;

Identical reference numbers are used in the figures for elements which are the same or have the same effect. Moreover, for the sake of easier overview, only reference numbers are represented in the individual figures which are required for the description of the respective figure.

DETAILED DESCRIPTION

Figure 1:
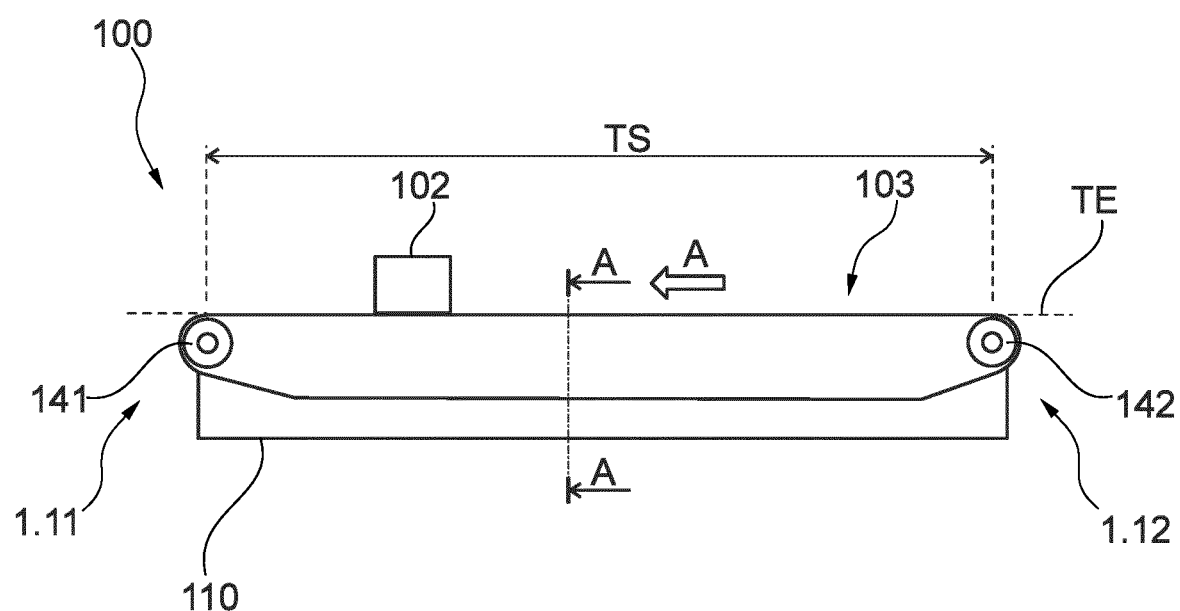
FIG. 1 is a side view of a conveying device.

FIG. 1 shows a conveyor 100 that conveys containers 102 along a transport direction "A" between various machines. The machines can be container treatment machines, handover stations, transfer stations, transition stations, or combinations thereof. A typical conveying device moves more than 10,000, and in some cases, more than 50,000 containers 102 per hour.

The transport direction "A" defines first and second perpendicular lines. The first perpendicular line passes through a conveying element 103 along a "vertical" direction. The second perpendicular line extends along a "transverse" direction.

The conveying device 100 includes a conveying element 103 that forms a closed loop. The conveying element 103 circulates endlessly along the transport direction "A." Examples of a conveying device 100 include a conveying belt, a conveying chain, a hinged band chain, and a conveying mat.

The conveying element's upper length forms a conveying plane TE on which containers 102 stand on their bases. The conveying element 103 goes around a front deflection device 131 at a front end 1.11 and a rear deflection device 142 at a rear end 1.12. Between the front and rear ends 1.11, 1.12 is a conveying line TS. Each deflection device 141, 142 includes a motor that drives the deflection device 141, 142. A suitable motor is an electric motor. Suitable electric motors include a gearless electric motor, a directly driven electric motor, a stepping motor, a servomotor, and a torque motor.

Figure 2:
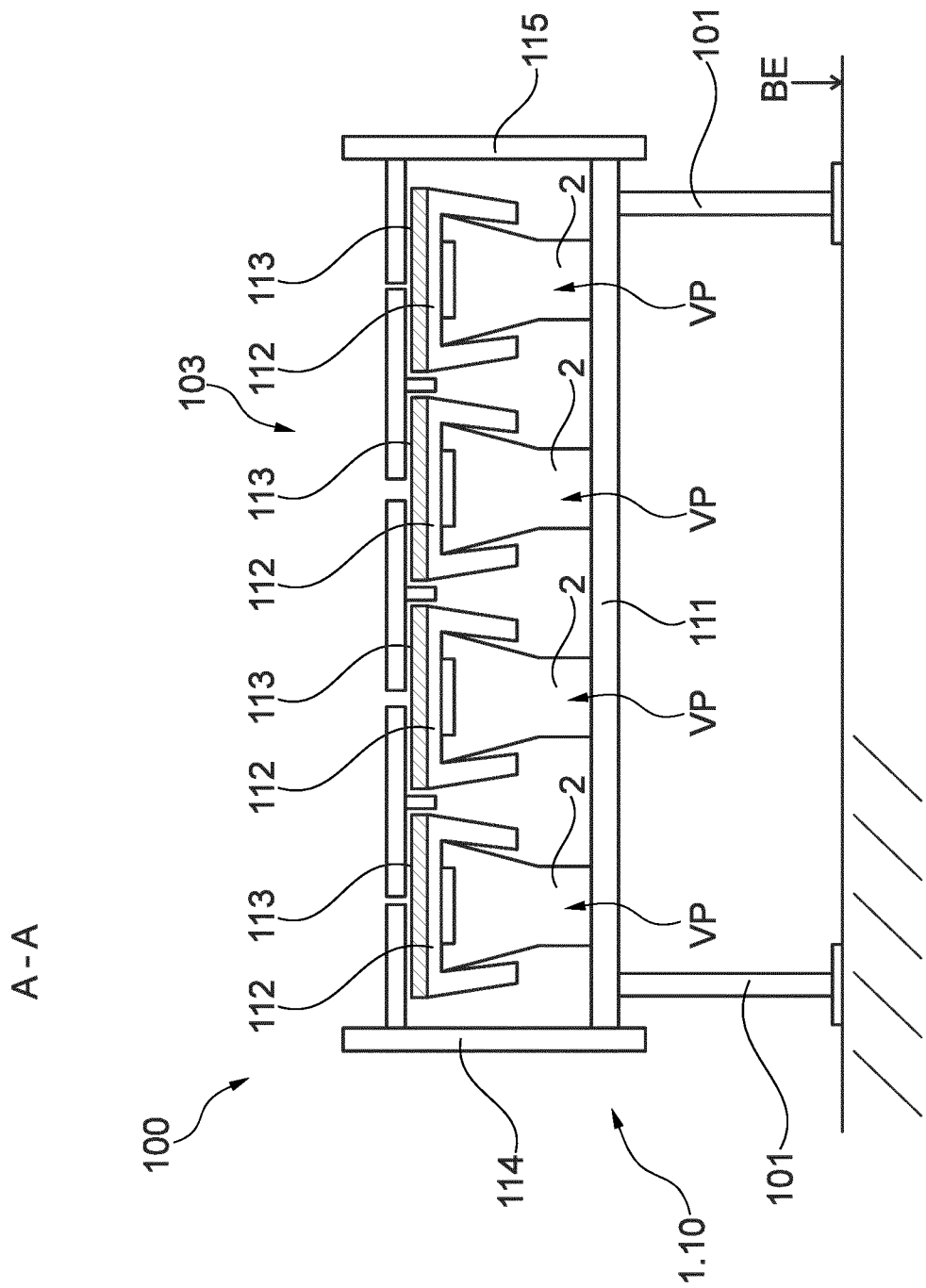
FIG. 2 is a sectional view of the conveying device of FIG. 1 taken along the section line "A."

Referring now to FIG. 2, sliding strips 113 support multiple conveying element 103 to form a horizontal conveying surface TE, which is shown in FIG. 1. The conveying elements 103 are arranged next to each other along the transverse direction. As a result, they form adjacent rows.

The conveying device 100 also includes a frame 110, shown in FIG. 1, on which its components can be arranged or accommodated. The frame 110 supports the conveying device 100.

Referring now to FIG. 2, the machine frame 110 comprise base supports. Each base support 111 extends over the conveying element's entire width in the transverse direction. Legs 101 support each base support 111 on the floor BE. The base supports 111 are disposed along the conveying line TS, typically at uniform spacing intervals, with each such base element 111 supported by legs 101. Typically, there will be one base support 111 near the front end 1.11 and another base support 111 near the rear end 1.12 of the conveying device 100.

Figure 6A:
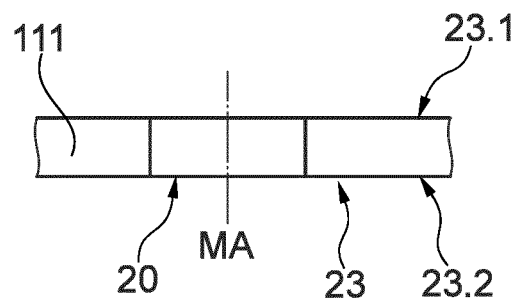
FIG. 6a is a side view of a perforation in a base support.
Figure 6B:
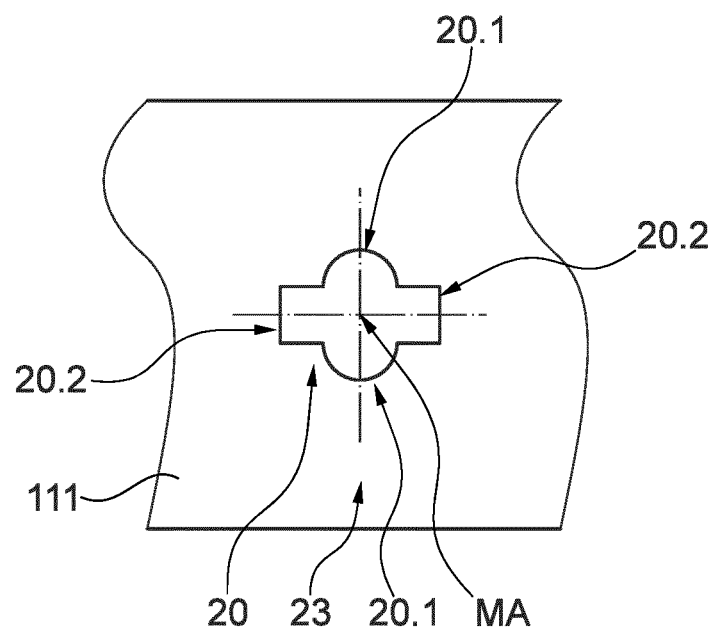

Referring now to FIGS. 6a and 6b, each base support 111 includes a flat surface section 23 and a perforation 20 through the flat surface section 23.

As shown in FIG. 6b, the perforation 20 is non-circular but with mirror symmetry. The illustrated perforation 20 has a pair of identical arcuate sections 20.1 and a pair of identical rectangular sections 20.2. In alternative embodiments, the perforation 20 is a quadrilateral, such as a rectangle or square. Such embodiments lack the arcuate sections 20.1 shown in FIG. 6b. Likewise, the base support 111, which extends transverse to the transport direction "A" can also comprise perforations 20. These perforations 20 are beneath corresponding sliding strips 113. embodiment The flat surface section 23 of the base support 111 comprises a planar upper side 23.1 and a planar underside 23.2. These sides are parallel. As a result, the flat surface section 23 has a constant surface thickness.

The conveying element 103 is guided so that it slides along the conveying line TS on a sliding strip 113. The sliding strip 113 extends along a plane that is parallel to and beneath the conveying plane TE.

Some embodiments feature several sliding strips 113. It is particularly useful to have sliding strips 113 along the entire conveying line TS along which the conveying element 103 moves. In such cases, there are several sliding strips 113 beneath the conveying element 103. In the particular example shown in FIG. 2, there are four sliding strips 113 arranged side-by-side along the transverse direction with their longitudinal extensions along the transport direction "A."

Some embodiments feature several sliding strips 113 that extend not only in the transverse direction but in the transport direction so that they are immediately adjacent to one another along the conveying line TS. In a preferred embodiment, the sliding strips 113 are arranged to be flush with each other, thus forming a straight row of sliding strips 113. The upper sides of the sliding strips are preferably made of a material with a low friction coefficient, such as a plastic.

At least a section of a sliding strip 113 is arranged at a profiled element 112 that is coupled to a base support 111 by a quick-release device 2. Embodiments include those in which the profiled element 112 has a C-shaped cross section and those in which it has a U-shaped cross section.

Figure 3:
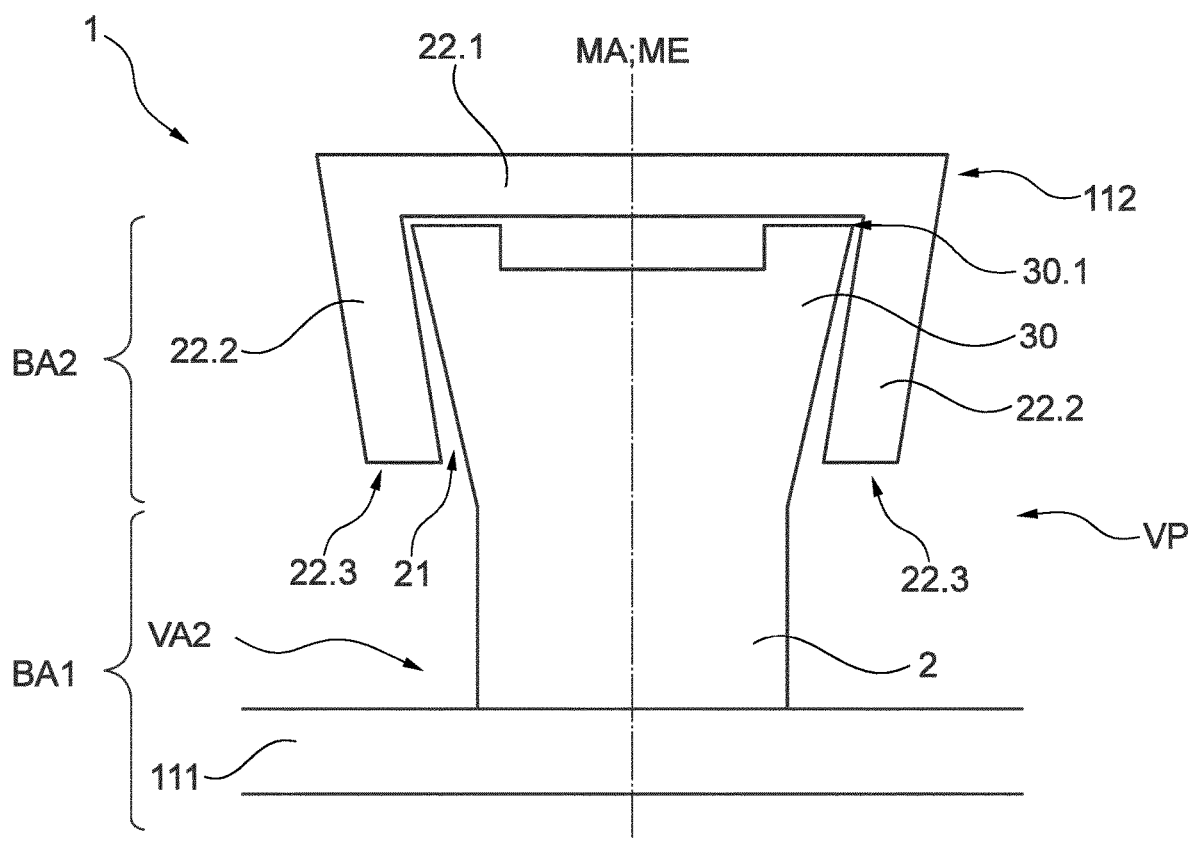
FIG. 3 is a side view of an exemplary embodiment of a quick fastener in a locking position.

Referring to FIG. 3, the profiled element 112 has a middle limb 22.1 and two side limbs 22.2. The sliding strip 113 is secured to the middle limb 22.1, either by being screwed, clamped, or adhesively bonded thereto. The profiled element 112 extends along a plane that is parallel to and beneath the plane spanned by the sliding strips 113. This plane lies beneath the conveying plane TE.

Each side limb 22.2 extends downward from the middle limb 22.1 to form an acute angle between the side limb 22.2 and the middle limb 22.1. The side limbs 22.2 extend downward to their free ends 22.3.

As shown in FIG. 3, the middle limb 22.1 and the side limb 22.2 define a downwardly-opening groove 21 that faces the base support 111 and that can be accessed from the base support 111. The groove's cross-section is that of an inverted cone.

The middle limb's width along the transverse direction corresponds to that of a sliding strip 113, as shown in FIG. 2. The sliding strip 113, which is rectangular when seen from above, has a length that extends in the transport direction "A". This length corresponds to that of the profiled element 112. Thus, the middle limb 22.1 is also essentially rectangular when seen from above.

A quick fastener 2 on the base support 111 of the machine frame 110 connects the profiled element 112 to the base support 111. In FIG. 3, the quick fastener 2 is in a locking position in which it securely connects the profiled element 112 to the base support 111.

Referring to FIG. 3, the quick fastener 2 includes first and second securing sections BA1, BA2 that extend along a medial axis MA, which lies in a medial plane ME.

The first securing section BA1 connects to the base support 111. In some embodiments, it does so with a non-positive fit connection. In others, it does so with a positive fit connection.

The second securing section BA2 connects to the profiled element 112. In some embodiments, it does with a non-positive fit connection. In others, it does so with a positive fit connection.

In some embodiments, when in the locking position, the first securing section BA1 is inserted to be latched into the base support 111 and the second securing section BA2 is inserted to be latched into the profiled element 112 or into the base support 111 respectively. In particular embodiments, when in the locking position VP, the first securing section BA1 latches by engaging with the perforation 20 of the base support 111. This can be seen in FIGS. 6a and 6b.

Figure 5C:
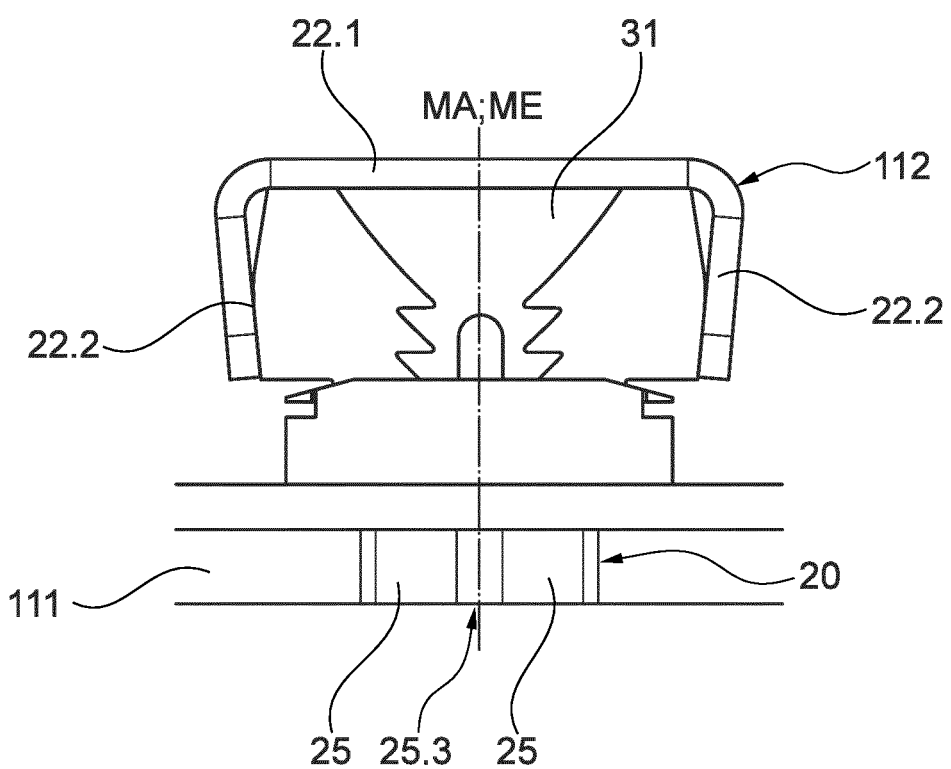

In other embodiments, when in the locking position VP, the first securing section BA1 snaps into the base support 111 and the second securing section BA2 snaps into the profiled element 112. The embodiment shown in FIG. 5a features a locking element 25 that snaps into position at the perforation 20 of the base support 111, as shown in FIG. 5c.

In other embodiments, when in the locking position VP, the first and/or second securing sections BA1, BA2 securely connect to the profiled element 112 and/or to the base support 111 by having the first and/or second securing sections BA1, BA2 engage with a locking element 25 behind the perforation 20 of the base support 111 and/or the cut-out opening 21 of the profiled element 112.

In a preferred embodiment, the profiled element 112 is configured to be locked into position by being pressed onto the quick fastener 2 in such a way that, when in the locking position VP, the quick fastener 2 securely connects the profiled element 112 to the base support 111.

FIG. 2 shows four quick fasteners 2 disposed side-by-side along the transverse direction. Each one has a first securing section BA1 that connects to a common base support 111. Each one also has second securing section BA2 that connects to a corresponding profiled element 112.

A sliding strip 113 connects securely to the upper side of its corresponding profiled element 112, for example by being screwed, clamped, soldered, adhesively bonded, or welded. Conveying elements 103 lie on the sliding strips 113 so as to be able to slide over the upper side of the sliding strips 113.

Right and left frame plates 114, 115 assist in guiding the conveying elements 103. The profiled elements 112 and/or the sliding strips 113 and/or the frame plates 114, 115 extend over the entire length of the conveying line TS. These components are either a single piece or in formed by joining multiple pieces.

FIGS. 4a to 4d show a metal, and preferably steel quick fastener 2 that makes a non-positive fit and/or positive fit connection between the base support 111 and the profiled element 112.

The quick fastener 2 connects securely by its first securing section BA1 to the base support 111. Such a connection arises, for example, by having the first securing section BA1 be welded, adhesively bonded, or soldered to the base support 111. In other embodiments, the quick fastener 2 and base support 111 form a unitary structure.

The embodiment shown in FIGS. 4a and 4b is one that forms a non-positive fit connection between the base support 111 and the profiled element 112. In this embodiment, the second securing section BA2 is a clamping body or carrier body 30 and the profiled element 112 makes a non-positive fit to the second securing section BA2 by being pressed onto the second securing section BA2 of the quick fastener 2, as shown in FIG. 4b.

The clamping body 30 is configured as a plate-shaped tab that can be securely connected as one piece to the base support 111. In the embodiment of FIG. 4a, the clamping body 30 is trapezoidal and tapered in the direction of the profiled element 112 such that its smallest width 31 is at an end section 30.1 that faces the profiled element 112.

On opposite sides of the end section 30.1, the clamping body 30 has straight contact surfaces 30.2, 30.3. When the clamping body 30 has been clamped into a non-positive fit with the profiled element 112, the contact surfaces 30.2, 30.3 provide support by contacting the side limbs 22.1 and the middle limb 22.1 of the profiled element 112. Once the profiled element 112 has been pushed or pressed into position onto the clamping body 30, its two side limbs 22.2 deform elastically so that the side limbs 22.2 makes a non-positive fit with the clamping body 30.

An alternative embodiment shown in FIGS. 4c and 4d results in a positive fit connection of the base support 111 and the profiled element 112 in the locking position VP of the quick fastener 2. In this embodiment, the free ends of the two side limbs 22.2 have receiver sections 22.5 that engage in a positive fit with corresponding nose-shaped engagement sections 30.5 at the clamping body 30. In some embodiments, engagement can be non-positive as well.

As shown in FIG. 4c and FIG. 4d, the two side limbs 22.2 elastically deform as the profiled element 112 is pushed or pressed onto the clamping body 30. Deformation continues until the snap-in receiver sections 22.5 engage the engagement sections 30.5 of the clamping body 30.

In another embodiment, the base support 111 connects to the profiled element 112 in the locking position of the quick fastener 2. The resulting fit can be a non-positive fit or a positive fit.

In an alternative embodiment, which is shown in FIGS. 5a-5c, the quick fastener 2 is a two-part device having a clamping body 30 and a separate driver body 31. The clamping body 30 forms the second securing section BA2 to which the profiled element 112 can be secured. The driver body 31 forms the first securing section BA1, which couples the quick fastener 2 to the base support 111.

Referring to FIGS. 6a and 6b, the base support 111 comprises a flat section 23 having a perforation 20 therethrough. The perforation 20 is non-circular.

As shown in FIG. 5a, the first securing section BA1 comprises locking fingers 25 that extend radially outwards from the medial axis MA. The illustrated embodiment has two such locking fingers 25.

As shown in FIG. 5a, each locking finger 25 is associated with a corresponding retaining element 25.1, 25.2 that extends along the medial axis MA. A gap 25.3 separates the retaining elements 25.1, 25.2. The gap 25.3 permits the retaining elements 25.1, 25.2 to elastically deform when pressed together.

The radially outward surfaces of the retaining elements 25.1, 25.2 have first counter-hooks WH1 formed thereon. When the quick fastener 2 is locked into position, these first counter hooks WH1 engage corresponding second counter hooks WH2 in the clamping body 30.

An opening 28 that is concentric with the medial axis MA passes through the clamping body 30. The opening 28 accommodates insertion of the driver body 31, as shown in FIG. 5b.

The second securing section BA2 comprises a contact section 24. In the locking position VP, the contact section 24 extends radially outward from and surrounds, or at least partially surrounds, the medial axis MA.

In a preferred embodiment, the contact section 24 fully surrounds the medial axis MA. In either case, the contact section 24 has a distal contact surface that faces the base support 111 when the quick fastener 2 is locked. The geometry of the contact section 24 and the perforation 20 is such that the contact section 24 cannot penetrate the perforation 20. Instead, it is supported at the flat section 23.

The process for locking the quick fastener 2 in FIGS. 5a-5c includes inserting the driver body 31 from above so that it penetrates the opening 28 of the clamping body 30 and using the profiled element 112 to press in the direction of the base support 111, as shown in FIG. 5b. This causes the first counter-hooks WH1 to engage the second counter-hooks WH2. This causes the driver body 31 to be received in the clamping body 30. The resulting fit is either a positive fit or a non-positive fit.

At the same time, there exists a force exerted by the inner sides of the side limbs 22.2 on the clamping body 30. By further pressing on the profile element 112, the locking elements 25, which have been pressed together during the pressing of the driver body 31, hook onto the underside of the base support 111 in the region of the perforation 20, as shown in FIG. 5c.

FIGS. 7a-7c show another two-part embodiment of a quick fastener 2 that is also not securely fastened to the base support 111. The two-part quick fastener 2 includes a driver body 31 and a clamping body 30, with the clamping body 30 having an opening 28 to accommodate the driver body 31.

Unlike the embodiment shown in FIGS. 5a-5c, that shown in FIGS. 7a-7c has both the first and second securing sections BA1, BA2 formed on the clamping body 30 itself.

At the first securing section BA1, the clamping body 30 forms the locking fingers 25. The driver body 31 can be arranged to form either a non-positive fit or a positive fit in the opening 28 of the clamping body 30.

At the second securing section BA2, the clamping body 30 forms elastically deformable tabs 32, 33 that are integral with the clamping body 30. In the locking position, as shown in FIG. 7b, the tabs 31, 32, being under tension, exert a force against the inner side of the profiled element's side limbs 22.2.

Figure 8A:
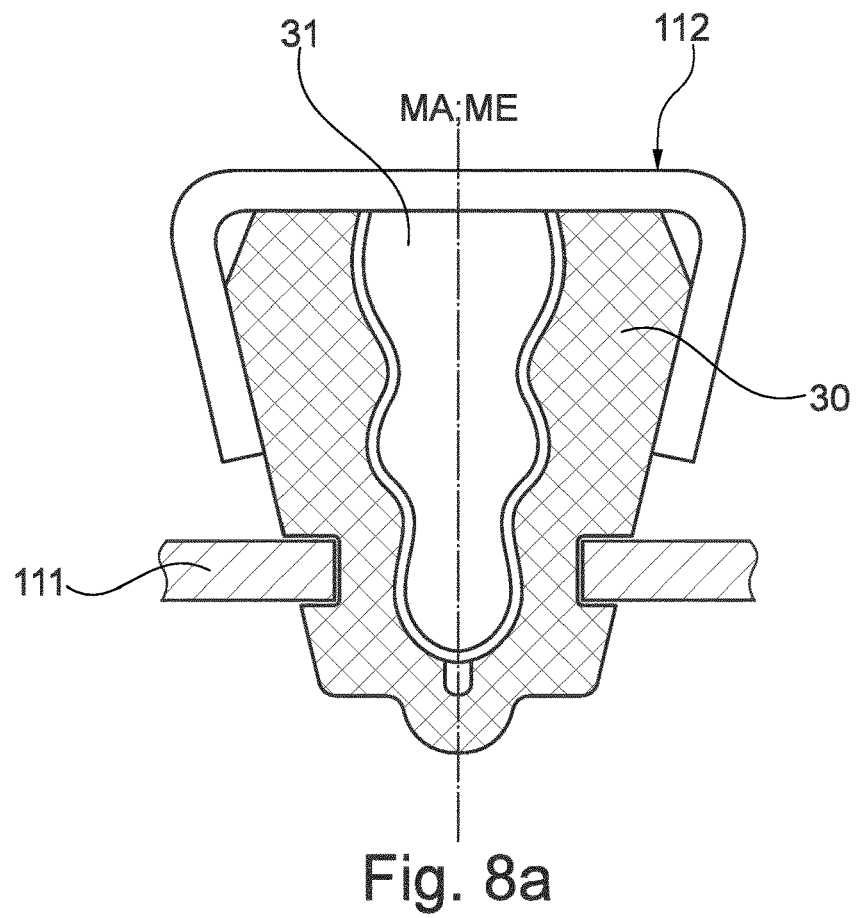
FIGS. 8a and 8b show a further embodiment of a quick fastener.
Figure 8B:
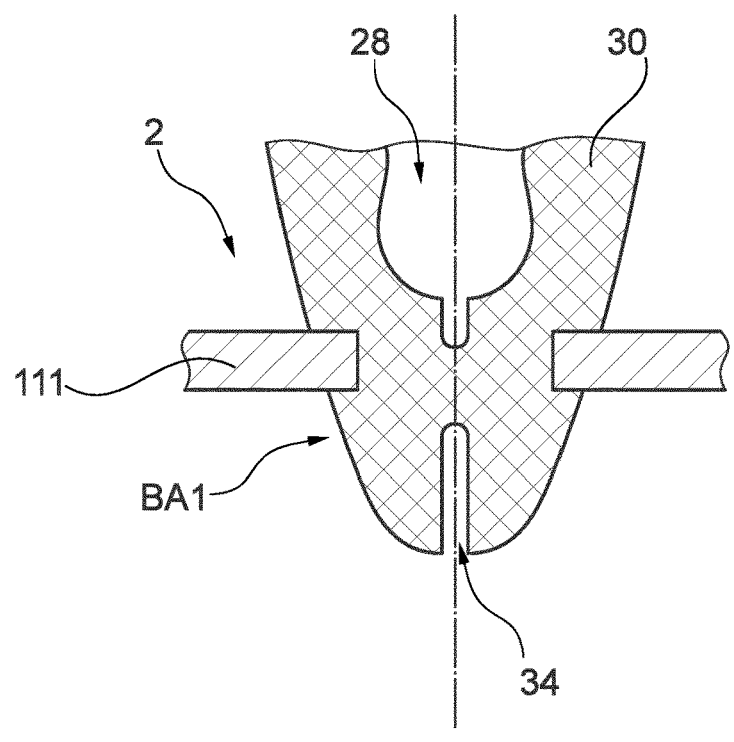

FIGS. 8a and 8b show another embodiment of a two-part quick fastener 2 that is not securely connected to the base section 111. The two-part quick fastener 2 includes a clamping body 30 and a driver body 31. The clamping body 30 again features an opening 28 to receive the driver body 31. However, the opening 28 does not pass through the clamping body 30. Instead, the opening 28 defines a blind hole.

The inner wall of the opening 28 has a corrugated surface in which the diameter of the opening 28 varies along the medial axis MA. This corrugated surface precisely fits a corresponding corrugated surface on the outer wall of the driver body 31. As a result, when pressed into the opening 28, the driver body 31 forms a precise fit, which can be a positive fit or a non-positive fit.

Referring to FIG. 8b, the clamping body 30 optionally includes a gap 34 in the region of its first securing section BA1. The gap 34 opens in a direction that faces away from the profiled element 112. In a preferred embodiment, the gap 34 is centered on the medial axis MA and extends along the medial axis MA.

Figure 9A:
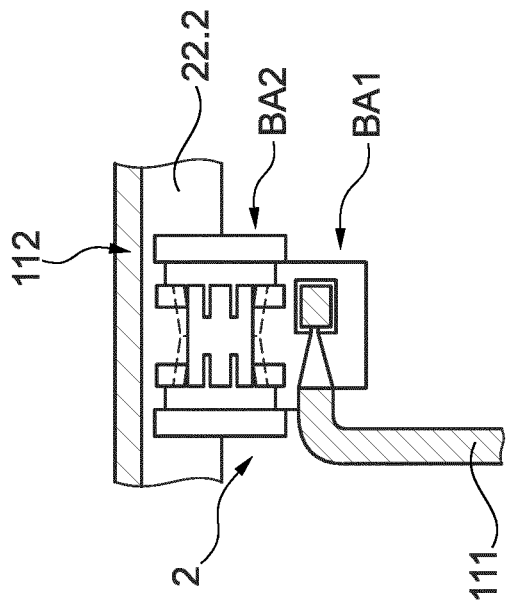
FIGS. 9a to 9d show a further embodiment of a quick fastener.
Figure 9B:
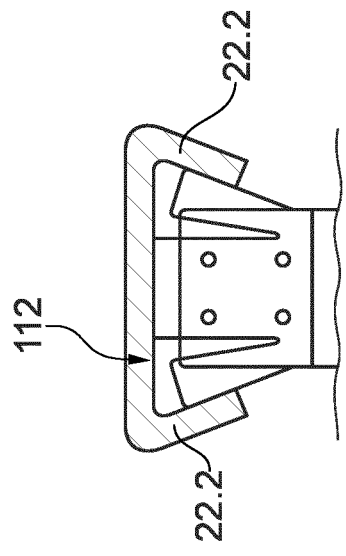
Figure 9C:
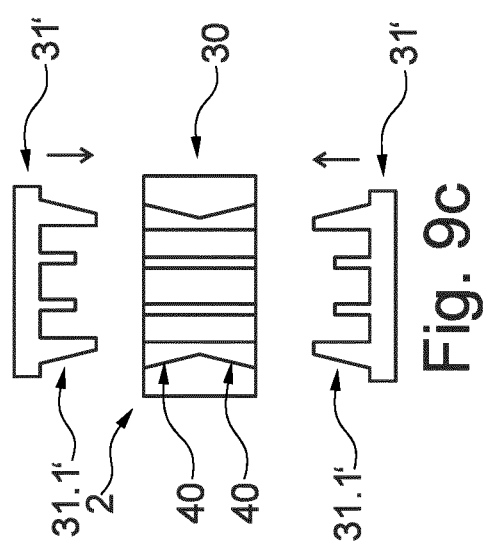

FIGS. 9a to 9d show a three-part quick fastener 2 that has two identical driver bodies 31' and a clamping body 30. As shown in FIG. 9c, the driver bodies 31' have mirror symmetry relative to the medial plane ME.

Figure 9D:
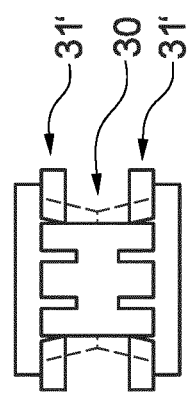

Each driver body 31' includes a contact wedge 31.1' having a side that forms an acute angle relative to the medial plane ME. In the illustrated embodiment, there are two such contact wedges 31.1. The receiving wedges 40 likewise form an acute angle relative to the medial axis MA and extend along the medial axis MA. When the quick-fastener 2 is in its locking position, with the clamping body 30 having been pressed into a locking position as shown in FIG. 9d, the corresponding receiving wedges 40 and the contact wedges 31.1 interdigitate as shown in FIG. 9d.

In operation, a tool is typically used to insert the quick fastener 2 laterally into an opening of the profiled element 112. The end result is that the driver bodies 31' are tensioned so as to exert a clamping force against the inner surfaces of the profiled element's side limbs 22.2, as shown in FIG. 9d. To promote a secure connection between the first securing section BA1 and the base section 111, this can, for example, be pushed over a nose and clamped there.

FIGS. 10a-10c show a three-part quick fastener 2 having two identical driver bodies 31'. Each clamping body 31' has contact wedges 31.1. Placing the quick fastener 2 in a locking position creates tension in the contact wedges 31.1. This causes a force against corresponding oblique contact surfaces 40 of the clamping body 30 in the locking position.

In contrast to the quick fastener 2 shown in FIGS. 9a-9d, the quick fastener shown in FIGS. 10a-10c includes two locking fingers 25 in the first securing section BA1. When the quick fastener 2 is in its locking position, the driver bodies 31' spread the locking fingers 25, thus creating tension. The locking fingers 25, having passed through the perforation 20 in the base support 111, are now hooked to the underside.

Figure 11A:
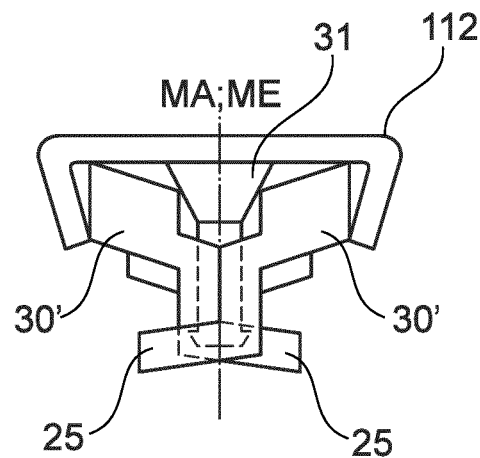
FIGS. 11a to 11c show a further embodiment of a quick fastener.
Figure 11B:
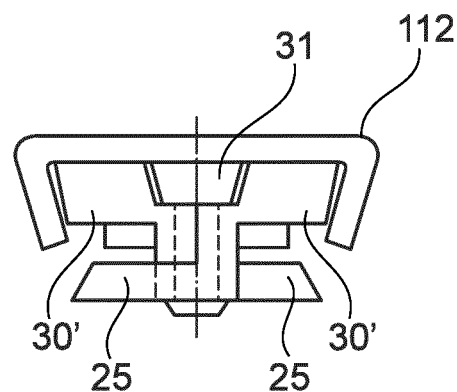
Figure 11C:
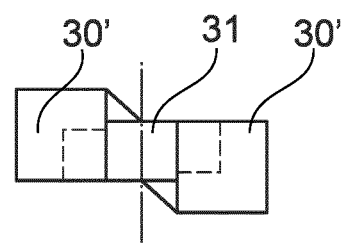

FIGS. 11a-11c show another three-part quick fastener 2 having a driver body 31 and two identical clamping bodies 30' that are offset from each other relative to the medial plane ME. Each clamping body 30' has tabs at its proximal and distal ends but projecting in opposite directions. As a result, each clamping body 30' is approximately S-shaped as can be seen in both FIGS. 11a and 11b, with the "S" having been deformed into a flatter letter in FIG. 11b.

The distal tab forms a locking finger 25 that engages the base support 111. Once the profiled element 112 has been pressed against the base support 111, the driver body 31 separates the clamping bodies 31', thus causing exertion of pressure by the clamping bodies 30' against the inner sides of the two side limbs 22.2. As a result, the clamping bodies 30' are locked to the profile element 112 at the second securing section.

In the same way, the driver body 31 also causes the locking fingers 25, which have passed through the perforation 20 of the base support 111, to spread apart. This hooks them to the underside of the base support 111.

FIGS. 12a-12c show a one-piece quick fastener 2. In FIG. 12b, the quick fastener 2 is in a non-tensioned position. In FIG. 12c, the quick fastener 2 is in a tensioned position in which it locks the base support 111 to the profiled element 112. The quick-fastener 2 is thus plastically deformable. It is useful for this quick fastener 2 to be produced from a metallic material, in particular steel. Suitable manufacturing methods include punching it out of a piece of steel or using a laser to cut it out.

As is apparent from FIG. 12a, the quick fastener 2 includes first and second securing sections BA1, BA2 that are integral with each other. The illustrated quick fastener 2 is a plate of approximately constant thickness and having a clamping body 30 and a contact section 24.

The clamping body 30 takes the form of an upside-down trapezoid having two tabs 32, 33. Each tab 32, 33 has first and second ends S1, S2. A transverse arm 32.1, 33.2 connects the second end S2 to the contact section 24.

The contact section 24 is not a solid piece. Instead, two cuts that extend along the medial axis MA define a punch section 37. As a result, the contact section 24 is able to move along the medial axis MA in the direction of locking fingers 25. When the profiled element 112 is put in place, the energy associated with such movement is transferred from the middle limb 22.1 of the profiled element 112 to the punch section 37, which deforms accordingly.

The resulting deformation of the punch section 37 is transferred to the transverse arms 32.1, 33.1, which then transfer it to the tabs 32, 33. This deflects the tabs 32, 33 outwards and hence away from the medial axis MA. This leads to tension that results in a force against the inner sides of the profile element's side limbs.

The deformation of the punch section 37 also results in outward deflection of the locking fingers 25. This places them in full contact with the flat section 23, thus securing the base section 111 to the quick fastener 2.

Figure 13A:
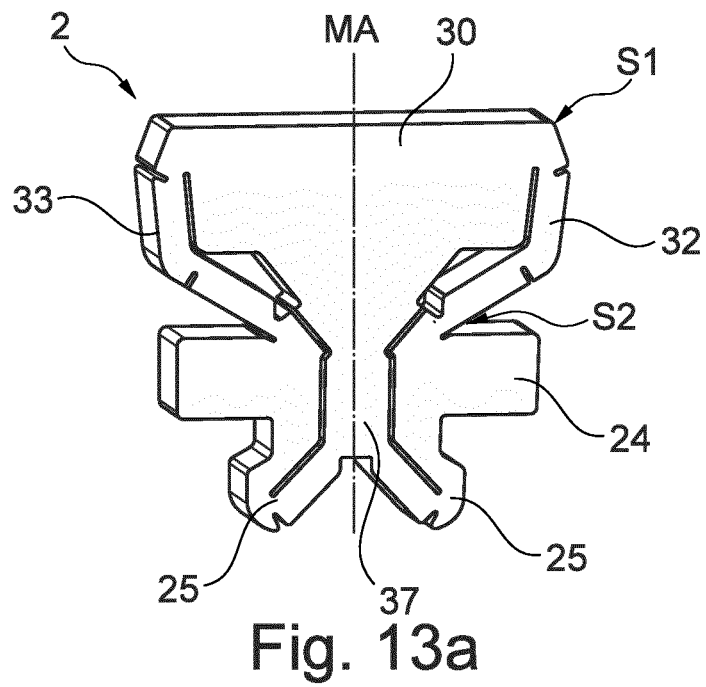
FIGS. 13a and 13b show a further embodiment of a quick-fastening device.
Figure 13B:
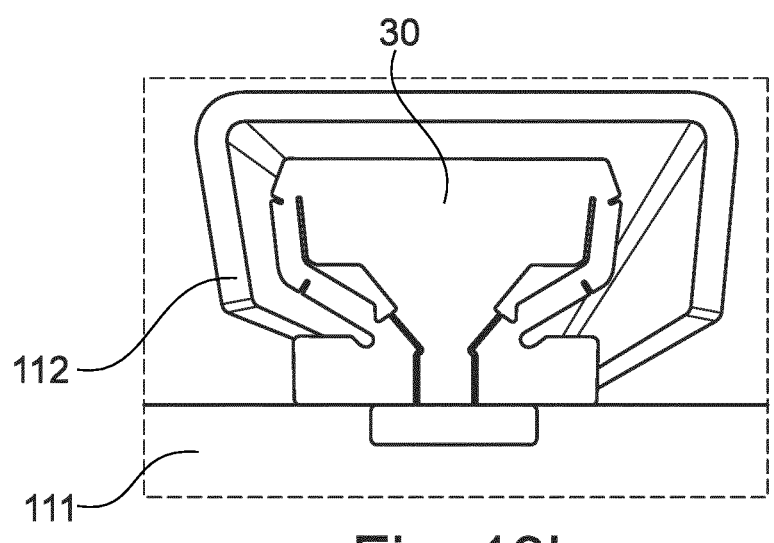

FIGS. 13a-13b show an embodiment of another single-piece quick fastener 2 according to the invention, which is likewise configured as being of one piece. In FIG. 13a, the quick fastener 2 is in its relaxed position. In FIG. 13b, it is in locking position, in which it connects the base support 111 securely to the profiled element 112.

The embodiment in FIGS. 13a-13b has tabs 32, 33 whose second ends S2 connect directly to the contact section 24, thus eliminating the transverse arms 32.1, 33.1. In addition, the clamping body 30 is triangular with its base facing towards the first securing section BA1 for receiving the profiled element 112. The punch section 37 is located at the triangle's distal tip, furthest from the profiled element 112.

When the profiled element 112 is pressed into position, the base transmits that force to the tip. This force then spreads the contact section 24, thus creating tension for placing the quick fastener 2 in its locking position.

FIGS. 14a to 14c show another single-piece quick fastener 2. FIGS. 14a and 14b show single-piece quick fastener 2 in its relaxed position while FIG. 13c shows it in its locked position.

As shown in FIG. 14a, the tabs 32, 33 extend upwards substantially along the medial axis MA from their second ends S2, which are at the contact section 24, to their first ends S1, which contact a triangular clamping body 30 having a geometry similar to that described in connection with FIG. 13a.

The distal tip of the triangular clamping body 30 extends into the region of the contact section 24. The tip thus forms the punch section 37. Pressing the profiled element 112 into position thus forces the two halves of the contact section 24 to move apart. This causes the locking fingers 25, which have passed through the perforation 30, to hook to the underside of the base support 111.

In the quick fastener 2 shown in FIGS. 15a-15c, the first securing section BA1 includes a pair of elastically deformable contact areas 24 that lie between two spring arms 40.1, 40.2 of a second securing section BA2. Locking fingers 25 extend inwardly from at least one of the contact areas 24.

As shown in FIG. 15c, the base support 111 comprises a curving tab 111.1 that curves upwards towards the profiled element 112. The curving tab 111.1 has a flat surface section 23 with a non-circular opening 20 that will ultimately engage the locking fingers. In this embodiment, placing the quick fastener 2 into its locking position includes pressing it onto the curving tab 111.1 so that its first securing section BA1 is on the curving tab 111.1.

Referring now to FIG. 15b, locking fingers 25 that protrude inwardly from the elastically deformable contact section 24 snap into the non-circular opening 20, thus locking the quick fastener 2 to the curving tab 111.1.

The two spring arms 40.1, 40.2 form a clamping body 30. In the locking position, the spring arms 40.1, 40.2 are spread outwards, thus applying a force against the inner side of the profiled element's side limb 22.2, against the spring force, in that the profiled element 112 is positioned onto the quick fastener 2.

The quick fastener 2 in this case is preferably made of a plastic, such as POM.

Figure 16A:
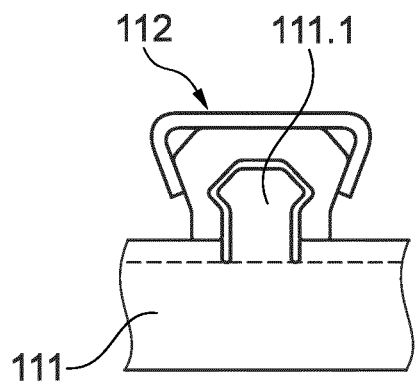
FIGS. 16a to 16d show a further embodiment of a quick fastener.
Figure 16B:
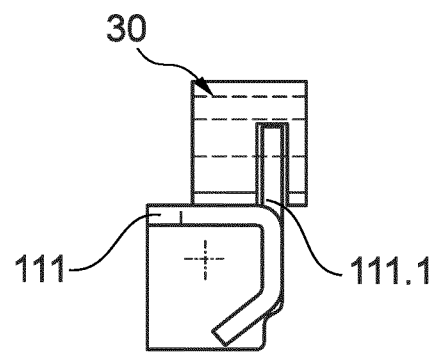
Figure 16C:
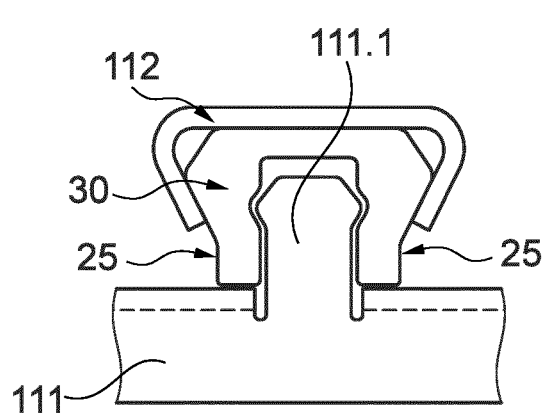
Figure 16D:
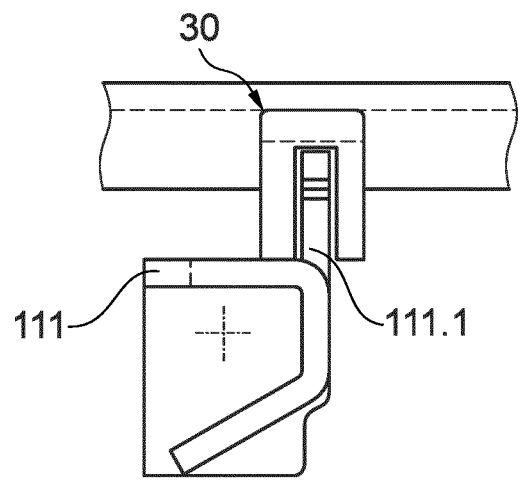

FIGS. 16a to 16d show a single-piece quick fastener 2 that, in its tensioned locking position, connects the base support 111 securely to the profiled element 112. In the locking position, the profiled element 112 presses the locking elements 25 of the first securing section BA1 against an upward tab 111.1 of the base support 111, as shown in FIGS. 16c and 16d, to form a fit that is either a non-positive fit or a positive fit.

Figure 17A:
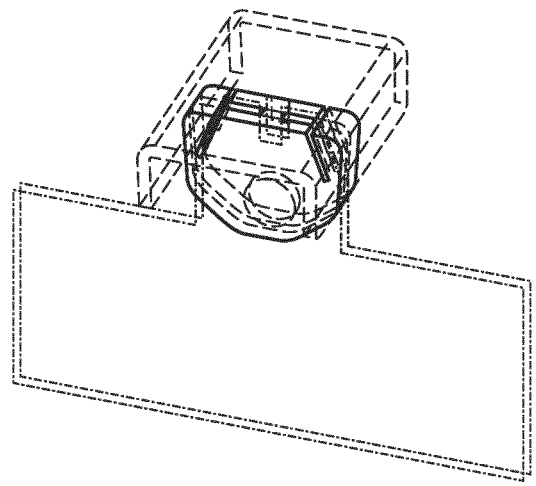
FIGS. 17a and 17b show a further embodiment of a quick fastener.
Figure 17B:
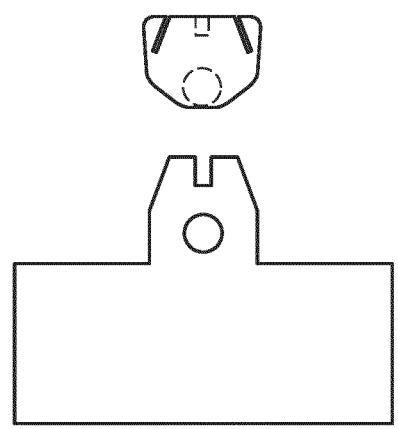

FIGS. 17a-17b show a quick fastener 2 that, in its tensioned locking position, secures the base support 111 securely to the profiled element 112. In this embodiment, a plastic locking finger comprises a section that is spatially adjusted to a corresponding opening in the base support 111. An engagement between this section of the plastic locking finger and a corresponding opening holds the quick fastener 2 on the base support 111.

At its upper end, the quick fastener 2 comprises two elastically deformable noses. In the locking position, these noses press against the inside against the profiled element 112 and therefore fix the profiled element 112.

FIGS. 18a-18c show a single-piece quick fastener 2 for use with a base support 111 that has a pair of perforations 20 in its flat surface 23, as seen in FIG. 18c. Once the quick fastener 2 is pushed into position, each perforation 20 holds one of its locking fingers 25. A pair of spring arms 40.1, 40.2, shown in FIG. 18a, forms a clamping body 30. In the locking position, these spring arms 40.1, 40.2 are spread apart, thus exerting tension against the side limbs 22.2 of the profiled element 112.

In any of the foregoing embodiments, the driver bodies 31, 31', rotate as the profiled element 112 is being pressed into position. The resulting movement resembles the screwing of a screw into a workpiece. This procedure allows a particularly secure and stable connection to be achieved.

The invention has been described heretofore by way of exemplary embodiments. It is understood that numerous modifications and derivations are possible, without thereby departing from the inventive concept underlying the invention.

The invention claimed is:

1. An apparatus comprising a conveying device, said conveying device comprising a machine frame comprising a base support, a conveying element arranged on said machine frame to form a loop that is driven to circulate so as to convey goods arranged thereon along a transport direction, front and rear deflection devices that guide said conveying element to form said loop, a profiled element, a sliding strip along which said conveying element slides during circulation thereof, said sliding strip being arranged on said profiled element, and a quick fastener that connects said profiled element to said base support, wherein said quick fastener comprises first and second securing sections for connection to said profiled element and to said base support, wherein said quick fastener is movable into a locking position in which said quick fastener connects said profiled element securely to said base support, wherein, when in said locking position, one of said first and second securing sections is securely connected to a structure selected from the group consisting of said profiled element and said base support, and wherein one of said first and second securing sections engages a structure selected from the group consisting of a locking finger behind a perforation of said base support and a cut- out opening of said profiled element.

2. The apparatus of claim 1 wherein said quick fastener is configured such as to be movable into a locking position in such a way that said quick fastener, when in said locking position, connects said profiled element securely to said base support.

3. The apparatus of claim 1, wherein said quick fastener comprises a first securing section and a second securing section, wherein said first securing section connects to said profiled element and said second securing section connects to said base support.

4. The apparatus of claim 1, wherein said quick fastener comprises a first securing section and a second securing section, wherein said first securing section connects to said profiled element and said second securing section connects to said base support, wherein said securing sections enable said quick fastener to transition into a locking position in which said quick fastener connects said profiled element securely to said base support.

5. The apparatus of claim 1, wherein said quick fastener comprises a first securing section and a second securing section, wherein said quick fastener is movable into a locking position in which said quick fastener connects said profiled element securely to said base support, wherein said first securing section connects to said profiled element and said second securing section connects to said base support, and wherein, when said quick fastener is in said locking position, at least one of said securing sections is locked into a structure selected from the group consisting of a perforation of said base support and a cut-out opening of said profiled element.

6. The apparatus of claim 1, wherein said quick fastener comprises first and second securing sections for connection to said profiled element and to said base support, wherein said quick fastener is movable into a locking position in which said quick fastener connects said profiled element securely to said base support, and wherein at least one of said securing sections, when in said locking position, is snapped into either said profiled element or said base support.

7. The apparatus of claim 1, wherein said profiled element is sized and shaped to be pressed onto said quick fastener to attain a locking position in which said profiled element is securely connected to said base support.

8. The apparatus of claim 1, wherein said quick fastener is configured such as to be movable into a locking position in which said quick fastener connects said profiled element securely to said base support, wherein said quick fastener is plastically deformable, and wherein, as a result of being plastically deformable, said quick fastener is able to transition into said locking position.

9. The apparatus of claim 1, wherein said quick fastener is configured such as to be movable into a locking position in which said quick fastener connects said profiled element securely to said base support, wherein said quick fastener is configured to transition into said locking position as a result of being pressed against a structure selected from the group consisting of said profiled element and said base support.

10. The apparatus of claim 1, wherein said quick fastener is a single-piece quick fastener.

11. The apparatus of claim 1, wherein said quick fastener is a multi-piece quick fastener.

12. The apparatus of claim 1, wherein said quick fastener is made of steel or polyoxymethylene.

13. The apparatus of claim 1, further comprising a first securing section and a second securing section, wherein said first securing section connects to said profiled element and said second securing section connects to said base support, and wherein said second securing section is securely connected to said base support by a process selected from the group consisting of welding, adhesive bonding, and soldering.

14. The apparatus of claim 1, wherein said quick fastener and said base support are integral with each other.

15. The apparatus of claim 1, wherein said quick fastener comprises a clamping body having a nose-shaped engagement section and wherein said profiled element comprises side limbs that define a groove, wherein said nose-shaped engagement section snaps into said groove.

16. The apparatus of claim 1, wherein said quick fastener comprises a first securing section and a second securing section, wherein said first securing section connects to said profiled element and said second securing section connects to said base support, wherein said second securing section is formed by a clamping body to be secured to said profiled element, and wherein said first securing section is formed by a driver body that secures said quick fastener to said base support.

17. The apparatus of claim 1, wherein said quick fastener comprises a clamping body for securing to said profile element and a driver body for being arranged at said base support and wherein said clamping body comprises an opening that at least partially penetrates a center of said clamping body for accommodating insertion of said driver body.

18. The apparatus of claim 1, wherein said quick fastener comprises a driver body and a clamping body, wherein said driving body comprises first counter-hooks, wherein said driving body engages said quick fastener to said base support, wherein said clamping body comprises an opening, wherein said clamping body comprises second counter-hooks, and wherein, to cause said quick fastener to be in a locking position, said driver body is inserted into said opening of said clamping body and pressed, using said profiled element, towards said base support, thereby causing first and second counter-hooks to engage each other, whereby said driver body is received in non-positive fit and/or positive fit in said clamping body in said locking position.

19. The apparatus of claim 1, wherein said quick fastener comprises a first securing section and a second securing section, wherein said first securing section connects to said profiled element and said second securing section connects to said base support, wherein said first and second securing sections are formed at a clamping body, and wherein said clamping body is configured to be secured to said profile element.

20. The apparatus of claim 1, wherein said quick fastener comprises a clamping body having tabs that are elastically deformable in a direction towards a medial axis of said quick fastener, wherein, when said quick fastener is in a locking position, said tabs are tensioned against an inner side of side limb sections of said profiled body.

21. The apparatus of claim 1, wherein said quick fastener comprises first and second driver bodies and a clamping body, wherein said clamping body enables said profiled element to be locked securely at said quick fastener.

22. The apparatus of claim 1, wherein said quick fastener comprises first and second identical driver bodies and a clamping body that arranges said profiled element securely at said quick fastener, wherein each driver body comprises a contact wedge, wherein said quick fastener transitions into a locking position as a result of said contact wedge being pressed into a corresponding contact surface provided at said clamping body, said corresponding contact surface extending to form a receiving wedge.

23. The apparatus of claim 1, wherein said quick fastener comprises a driver body that couples said quick fastener to said base support, wherein said base support has an underside, wherein said underside has a perforation, wherein said quick fastener comprises locking fingers, said locking fingers being spread by said driver body during tensioning, and wherein, in a locking position in which said quick fastener fastens said profile element securely to said base support, a counter hook hooks into said perforation.

24. The apparatus of claim 1, wherein said quick fastener comprises two S-shaped clamping bodies and a driver body for arranging said quick fastener at said base support, wherein each clamping body has a locking finger at a distal end thereof, and wherein insertion of said driver body causes said clamping bodies to exert a force.

25. The apparatus of claim 1, wherein said quick fastener comprises a plate, a contact section, an upside-down trapezium, and arm- shaped tabs each tab section having a first end that connects to said trapezium and a second end at said contact section.

26. The apparatus of claim 1, wherein said quick fastener comprises locking fingers and a punch section that interrupts said contact section along a medial axis of said quick fastener, wherein said punch section is movable along said medial axis toward said locking fingers.

27. The apparatus of claim 1, wherein said quick fastener comprises a plate, a contact section, an upside-down trapezium, and arm- shaped tabs each tab section having a first end that connects to said trapezium and a second end that connects to said contact section.

28. The apparatus of claim 1, wherein said base support comprises a curving tab that curves upwards toward said profiled element, wherein said curving tab comprises a flat surface having a non-circular opening, and wherein, when said quick fastener is in a locking position, said tab exerts a clamping force on said profile element.

29. The apparatus of claim 1, wherein said quick fastener comprises a clamping body that is formed by elastic spring arms on opposite sides of a medial axis of said clamping body, said spring arms being connected at a contact section of said quick fastener.

30. The apparatus of claim 1, wherein said quick fastener comprises locking fingers and a punch section that interrupts said contact section along a medial axis of said quick fastener, wherein said punch section is movable along said medial axis toward said locking fingers, and wherein said locking fingers engage corresponding perforations in said base support.

31. A quick fastener comprising first and second securing sections for connection to a profiled element and to a base support, respectively, both of which are constituents of a conveying device that comprises a machine frame, a conveying element that forms a loop that is driver to circulate so as to convey goods arranged thereon along a transport direction, front and rear deflection devices that guide said conveying element to form said loop, and a sliding strip along which said conveying element slides during circulation thereof, said sliding strip being arranged on said profiled element, wherein said quick fastener connects said profile element to said base support, wherein said quick fastener is movable into a locking position in which said quick fastener connects said profiled element securely to said base support, wherein, when in said locking position, one of said first and second securing sections is securely connected to a structure selected from the group consisting of said profiled element and said base support, and wherein one of said first and second securing sections engages a structure selected from the group consisting of a locking finger behind a perforation of said base support and a cut-out opening of said profiled element.

\* \* \* \* \*